United States Patent [19]
Lee

[11] Patent Number: 5,094,374
[45] Date of Patent: Mar. 10, 1992

[54] LOCK DEVICE FOR A SPARE TIRE CARRIER

[75] Inventor: David N. Lee, Almont, Mich.

[73] Assignee: General Motors Corporation, Detroit, Mich.

[21] Appl. No.: 668,287

[22] Filed: Mar. 8, 1991

[51] Int. Cl.$^5$ .............................................. B62D 43/00
[52] U.S. Cl. ................................. 224/42.21; 224/42.28
[58] Field of Search ............... 224/42.21, 42.25, 42.28, 224/282, 42.06

[56] References Cited

U.S. PATENT DOCUMENTS

| | | | |
|---|---|---|---|
| 2,698,118 | 12/1954 | Dickason | 224/42.21 |
| 3,283,973 | 11/1966 | Wargo | 224/42.21 |
| 3,371,832 | 3/1968 | Sekino et al. | 224/42.21 |
| 3,613,971 | 10/1971 | Betz | 224/42.21 |

OTHER PUBLICATIONS

J. C. Whitney Catalogue 1973, Catalog No. 314, "Van Rear Door Tire Carriers".

Primary Examiner—Henry J. Recla
Assistant Examiner—Keith Kupferschmid
Attorney, Agent, or Firm—Edward J. Biskup

[57] ABSTRACT

A spare tire carrier for a sport utility vehicle with a drop tailgate is provided with a lock device that allows the spare tire carrier to be secured in position when the drop tailgate is in an open position. The lock device comprises a collar rotatably mounted on the spare tire carrier and a pin biased by a spring through a hole which holds the collar in position. A striker on the collar fits into a keeper in the form of a slot or a latching mechanism on a side of the drop tailgate to secure the spare tire carrier in position when the drop tailgate is in the open position.

15 Claims, 2 Drawing Sheets

LOCK DEVICE FOR A SPARE TIRE CARRIER

BACKGROUND OF THE INVENTION

This invention relates generally to outside spare tire carriers and more specifically to a lock device for an outside spare tire carrier.

It is known in the art to provide a spare tire carrier on the outside of a vehicle, especially a sport utility vehicle. Often, spare tire carriers are mounted on a vehicle's rear so that the tire cannot interfere with the normal vehicle functions. But this causes problems if the vehicle is equipped with a drop tailgate assembly. In this situation, a rear mounted spare tire carrier can interfere with the operation of the drop tailgate.

To overcome this difficulty, spare tire carriers are sometimes mounted on a pivotable frame. Such a device is disclosed in U.S. Pat. No. 4,817,834 issued to Raywood C. Weiler on Apr. 4, 1989. This patent discloses a bumper mounted spare tire carrier which is mounted on a rear bumper by a first mounting bracket and mounted to a drop tailgate by a second mounting bracket. An arm mounted to the first mounting bracket is pivotable between a closed position next to the drop tailgate and an open position out of the way of the drop tailgate. As a result, the drop tailgate may be opened or closed without interference from the spare tire carrier. A latching mechanism selectively latches the arm to the second mounting bracket on the drop tailgate to secure the spare tire carrier during operation of the vehicle.

When operating a sport utility vehicle equipped with such a spare tire carrier it may sometimes be desirable to transport articles for a short distance, such as bags of refuse from garage to roadside, while leaving the drop tailgate in the open position. Accordingly, the present invention is directed to a lock device which serves to secure the spare tire carrier to the tailgate when the latter is in the lowered position so it will not be necessary to load the articles, close the tailgate and spare tire carrier, move the vehicle a short distance, and swing the carrier outwardly to open the tailgate again.

SUMMARY OF THE INVENTION

An object of the present invention is to provide a new and improved spare tire carrier that is hinged to allow use of a drop tailgate.

Another object of the present invention is to provide a new and improved spare tire carrier that is hinged to allow use of a drop tailgate which includes a means to secure the spare tire carrier in an open position.

Yet another object of the present invention is to provide a new and improved spare tire carrier that is hinged to allow use of a drop tailgate which includes a rotatable collar having a striker which fits into a slot on the drop tailgate to secure the spare tire carrier in an open position.

Still another object of the present invention is to provide a new and improved spare tire carrier that is hinged to allow use of a drop tailgate which includes a rotatable collar having striker which fits into a latch assembly on the drop tailgate to secure the spare tire carrier in an open position.

The present invention meets the above objects by providing a spare tire carrier that swings to an open position and may be latched to the tailgate when in the open position. The spare tire carrier comprises a pair of hinge members fixedly connected to a rear corner of the vehicle and a tubular frame member that is pivotally attached to the pair of hinge members. A spare tire is mounted on the tubular frame member and a latching mechanism latches the tubular frame member to an exterior surface of the drop tailgate when the latter is in the raised closed position during normal operation of the vehicle. More specifically, a lock device is supported by being rotatably attached to the tubular frame member and includes a collar rotatably mounted on the tubular frame member. A pin housing is threadably fitted into the collar and a pin is fitted into the pin housing. The pin is biased inward by a spring inside of the pin housing. A striker housing is fixedly mounted on the collar opposite the pin housing, and a striker is threadably inserted into the striker housing. The tubular frame member has a first and second hole both of which can receive the pin, with the second hole being located 90 degrees from the first hole on the tubular shaft. On one side the drop tailgate has a keeper into which the striker may fit, and when the striker fits into the keeper the spare tire carrier is secured to the side of the drop tailgate. The keeper may either be in the form of a slot into which the striker is fit, or the keeper may be a latching mechanism which lathes the striker in place. The lock device is normally in a position where the pin is located in the second hole so that the striker cannot be received by the slot and is maintained in this position by the spring. But if the pin is withdrawn from the second hole and the collar is allowed to rotate to where the pin can fit into the first hole, the striker can fit into the slot so that the spare tire carrier is secured in an open position.

Other objects and features of the invention will become apparent to those skilled in the art as disclosure is made in the following detailed description of a preferred embodiment of the invention which sets forth the best mode of the invention contemplated by the inventor and which is illustrated in the accompanying sheets of drawing.

DETAILED DESCRIPTION OF THE PREFERRED EMBODIMENT

Figure 1:
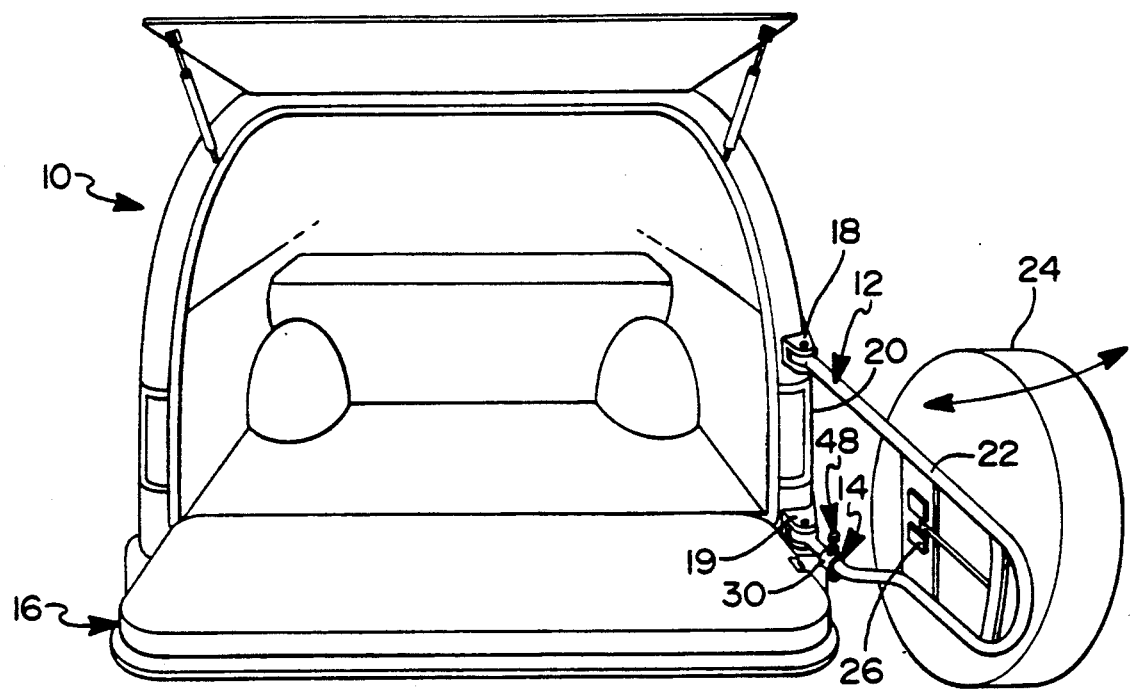
FIG. 1 is a rear view of a sport utility vehicle with a drop tailgate in an open position having a spare tire carrier made according to the present invention.

Referring now to the drawings, a sport utility vehicle 10 with a spare tire carrier 12 that has a lock device 14 is shown in FIG. 1. Since the sport utility vehicle 10 has a drop tailgate 16, the spare tire carrier 12 is designed to swing outwardly to an open position to allow use of the drop tailgate, as shown in FIG. 1. The spare tire carrier 12 comprises a pair of vertically spaced hinge members 18 and 19 mounted on a rear corner 20 of the sport utility vehicle 10. A generally U-shaped tubular frame member 22 is pivotally mounted on the pair of hinge members 18 and 19 and carriers a spare tire 24 which is removably mounted on the tubular frame member 22.

A latching mechanism 26 is fixedly mounted on the tubular frame member 22 to latch the spare tire carrier 12 to a latch receptacle (not shown) on an exterior surface (not shown) of the drop tailgate 16 during normal use. The latching mechanism 26 can be released from the latch receptacle to allow the spare tire carrier 12 to be swung to the open position, as shown in FIG. 1, so that the drop tailgate 16 may be opened for use. The preceding described system is well known in the art and is presently in use on GENERAL MOTORS S-15 JIMMYs and CHEVROLET S-10 BLAZERs.

Figure 4:
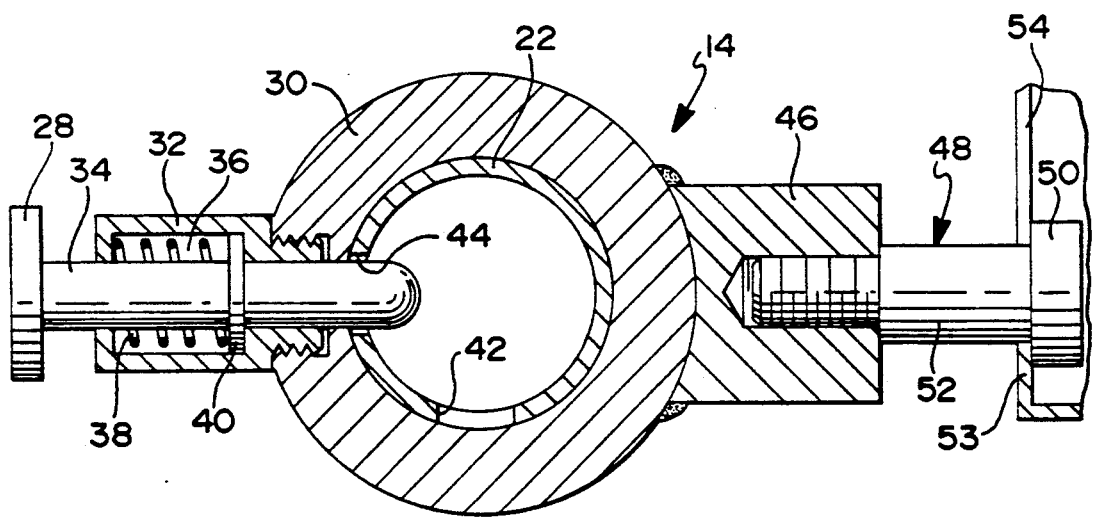
FIG. 4 is an enlarged sectional view taken along line 4—4 of FIG. 3 showing the lock device.

The lock device 14 has been added to the above spare tire carrier 12 to allow the spare tire carrier 12 to be locked in place when the drop tailgate 16 is in the open position. As shown in FIG. 4, the lock device 14 comprises a collar 30 which is rotatably mounted on the tubular frame member 22. A pin housing 32 is threadably fitted into the collar 30, and a pin 34 provided with a handle 28 extends through the pin housing 32 and through the collar 30. The pin housing 32 has an interior cavity 36 which contains a spring 38. The spring 38 engages a flange 40 rigid with a portion of the pin 34 inside the cavity 36 and biases the pin 34 inward through the collar 30 and through a first hole 44 in the tubular frame member 22. The tubular frame member 22 has a second hole 42 located 90 degrees from the first hole 44.

Figure 3:
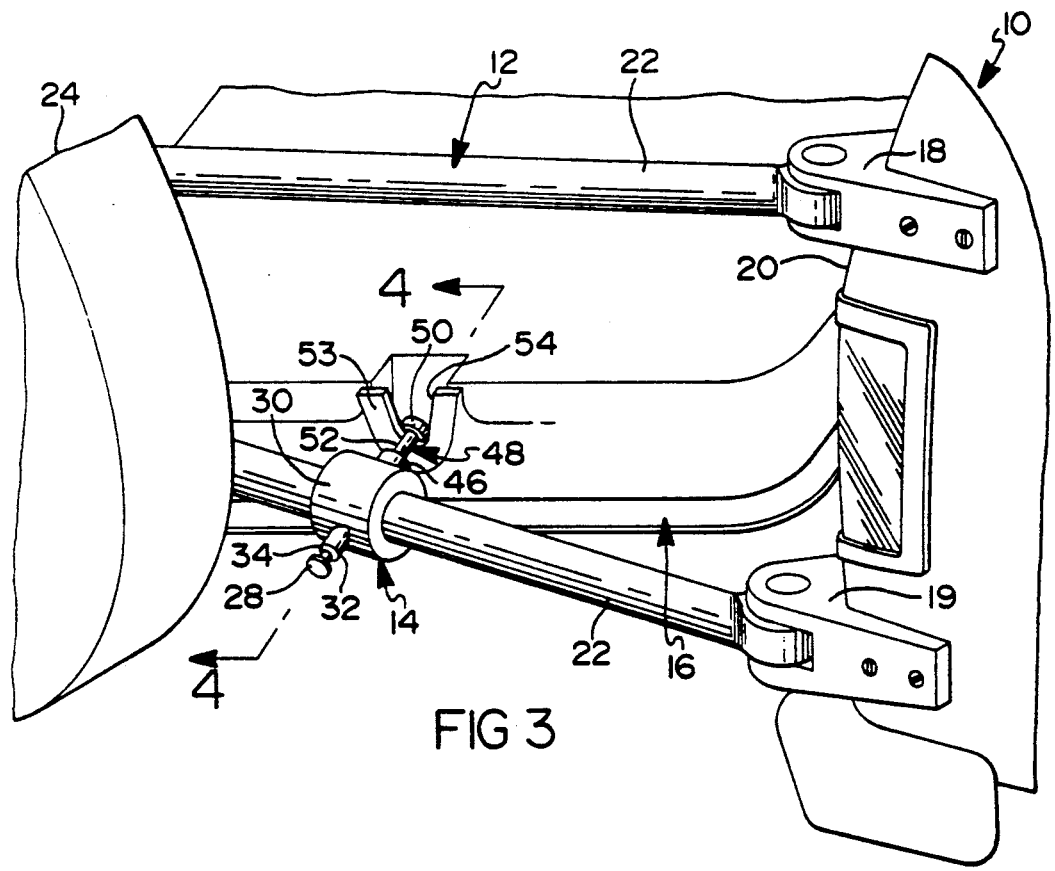
FIG. 3 is a partial perspective view of the spare tire carrier of FIG. 1 showing the lock device of the tubular frame and the slot of the drop tailgate with the spare tire carrier latched to the drop tailgate.

A striker housing 46 is welded onto the collar 30 opposite the pin housing 32, and a striker 48 is threadably inserted into the striker housing 46. The striker 48 has a flange portion 50 at one end and a shaft portion 52 between the flange portion 50 and the striker housing 46. As shown in FIG. 3, a keeper 53 is located in a side of the drop tailgate 16 to receive the striker 48 and secure the spare tire carrier in position. The keeper 53 can be in the form of a slot 54 which is sized sot hat the shaft portion 52 of the striker 48 can fit into the slot 54 and the flange portion 50 can hold the striker 48 in place. The keeper 53 could also be in the form of a latching mechanism (not shown) to latch and hold the shaft portion 52 of the striker 48 in place. The existing side latching mechanism of the drop tailgate 16 which is presently in use on GENERAL MOTORS S-15 JIMMYs and CHEVROLET S-10 BLAZERs can be used as the keeper 53 and latching mechanism of this form. If this is the case no added device is needed on the drop tailgate 16 to implement this invention since the existing drop tailgates 16 already are equipped with the needed latching mechanism.

Figure 2:
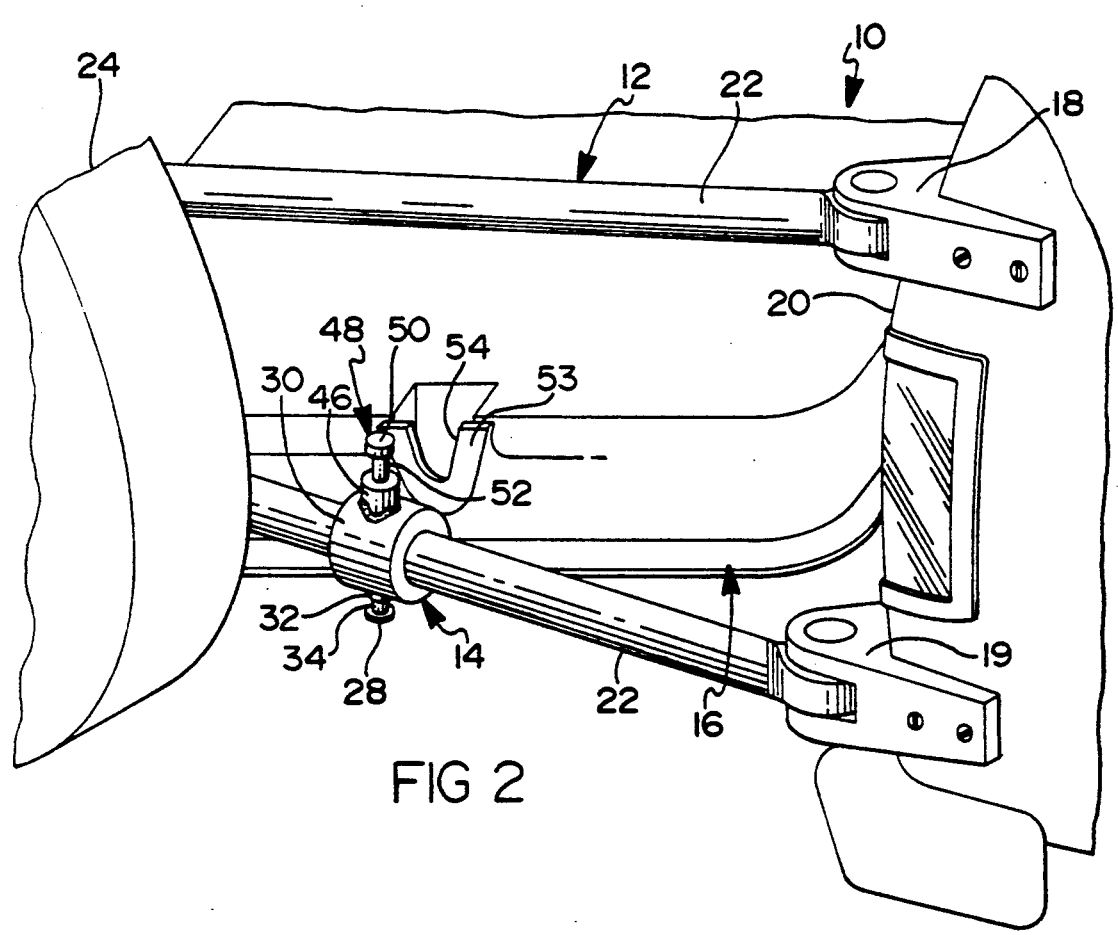
FIG. 2 is a partial perspective view of the spare tire carrier of FIG. 1 showing the lock device of the tubular frame and the slot of the drop tailgate with the spare tire carrier not latched to the drop tailgate.

In normal operation of the sport utility vehicle 10 with the tailgate 16 closed, the spare tire carrier 12 is latched to the drop tailgate 16 by the latching mechanism 26. When it is desired to open the drop tailgate 16, the spare tire carrier 12 is unlatched from the drop tailgate 16 and the spare tire carrier 12 is swung out of the way o the pair of hinge members 18 and 19, as shown in FIG. 1. As shown in FIG. 2, during normal operation the lock device 14 is in a position where the striker is located in a vertical plane so it 48 cannot engage the keeper 53. This is realized by having the pin 34 located in the second hole 42.

The lock device 14 can be rotated to an engaged position with the slot 54 by grasping the handle 28 and pulling the pin 28 out of the second hole 42. Thus, with the tubular frame member 22 positioned adjacent the lowered tailgate 16 as seen in FIG. 3, the collar 30 can then be rotated until the pin can extend through the first hole 44, as seen in FIG. 4, at which time the shaft portion 52 of the strike 48 is located in the keeper 53. By locating the shaft portion 52 of the striker 48 in the keeper 53, the enlarged flange portion 50 holds the tubular frame member 22 in place resulting in the spare tire carrier 12 being secured in the open position.

I wish it to be understood that I do not desire to be limited to the exact details of the construction shown and described, for obvious modifications will occur to a person skilled in the art.

The embodiments of the invention in which an exclusive property or privilege is claimed are defined as follows:

1. A spare tire carrier for a vehicle having a drop tailgate, the spare tire carrier adapted to swing to an open position and be latched to the tailgate in the open position, the spare tire carrier comprising:
   hinge means fixedly connected to a rear corner of the vehicle;
   a frame member pivotally attached to the hinge means;
   a spare tire mounted on the frame member;
   a latching mechanism for fixedly attaching the frame member to the drop tailgate when the latter is in a closed, vertical position; and
   a lock device attached to the frame member for connecting the spare tire carrier to the drop tailgate when the drop tailgate is in an open, horizontal position so as to maintain the spare tire carrier secured to the drop tailgate.

2. The spare tire carrier as set forth in claim 1 wherein the hinge means comprises a pair of hinge members.

3. The spare tire carrier as set forth in claim 2 wherein the hinge members are vertically spaced.

4. The spare tire carrier as set forth in claim 1 wherein the frame member comprises a tubular frame member.

5. The spare tire carrier as set forth in claim 4 wherein the tubular frame member is generally U-shaped.

6. The spare tire carrier as set forth in claim 1 wherein the lock device is rotatably attached to the frame member.

7. A spare tire carrier for a vehicle having a drop tailgate, the spare tire carrier adapted to swing to an open position and be latched to the tailgate in the open position, the spare tire carrier comprising:
   a pair of hinge members fixedly connected to a rear corner of the vehicle;
   a tubular frame member pivotally attached to the pair of hinge members;
   a spare tire mounted on the frame member;
   a latching mechanism for fixedly attaching the frame member to the tailgate when the latter is in a closed, vertical position; and
   a lock device rotatably attached to the tubular frame member for connecting the spare tire carrier to the drop tailgate when the drop tailgate is in an open, horizontal position so as to maintain the spare tire carrier secured to the drop tailgate.

8. The spare tire carrier as set forth in claim 7 wherein the hinge members are vertically spaced.

9. The spare tire carrier as set forth in claim 7 wherein the tubular frame member is generally U-shaped.

10. The spare tire carrier as set forth in claim 7 wherein the lock device comprises:
    a collar rotatably mounted on the tubular frame member;
    a pin housing threadably fitted into the collar;
    a pin fitted into the pin housing and biased inward by a spring inside of the pin housing;

a striker housing fixedly mounted on the collar opposite the pin housing;

a striker threadably inserted into the striker housing;

the tubular frame member having a first hole into which the pin is engageable;

the tubular frame member having a second hole into which the pin is engageable;

a keeper adapted to be secured to a side of the drop tailgate whereby the striker engages the keeper when the tailgate is in the open position;

the spare tire carrier being latched to an exterior surface of the drop tailgate during normal operation of the vehicle; and the spare tire carrier is attached to the tailgate by the striker engagement with the keeper when the drop tailgate is in an open position and the tubular frame member is positioned adjacent the tailgate when the tailgate is in its open position to maintain the spare tire carrier secured to the drop tailgate.

11. The spare tire carrier as set forth in claim 10 wherein the second hole is located 90 degrees from the first hole on the tubular frame.

12. The spare tire carrier as set forth in claim 10 wherein the pin of the lock device engages the second hole during normal operation of the vehicle; and the pin of the lock device engages the first hole when the spare tire carrier is attached by the striker to the keeper on the side of the drop tailgate.

13. The spare tier carrier as set forth in claim 10 wherein the keeper comprises a slot.

14. A spare tire carrier for a vehicle having a drop tailgate, the spare tire carrier adapted to swing to an open position and be latched to the tailgate in the open position, the spare tire carrier comprising:

a pair of vertically spaced hinge members fixedly connected to a rear corner of the vehicle;

a generally U-shaped tubular frame member pivotally attached to the pair of hinge members;

a spare tire mounted on the tubular frame member;

a latching mechanism for fixedly attaching the tubular frame member to the tailgate when the latter is in the closed, vertical position;

a lock device rotatably attached to the tubular frame member for connecting the spare tire carrier to the drop tailgate when the drop tailgate is in an open, horizontal position and to maintain the spare tire carrier secured to the drop tailgate;

the lock device including a collar rotatably mounted on the tubular frame member;

a pin housing threadably fitted into the collar;

the pin housing having an interior cavity;

a pin fitted into the interior cavity of the pin housing;

a flange abuts a portion of the pin within the interior cavity;

a spring fitted into the interior cavity of the pin housing;

the pin being biased inward by the spring pressing against the flange inside of the pin housing;

a striker housing fixedly mounted on the collar opposite the pin housing;

a striker threadably inserted into the striker housing;

the tubular frame member having a first hole into which the pin is engageable;

the tubular frame member having a second hole into which the pin is engageable, the second hole being located 90 degrees from the first hole on the tubular shaft;

a keeper adapted to be secured to a side of the drop tailgate whereby the striker engages the keeper when the tailgate is in the open position;

the spare tire carrier being latched to an exterior surface of the drop tailgate during normal operation of the vehicle;

the pin of the lock device engaging the second hole when during norma operation of the vehicle;

the spare tire carrier is attached to the tailgate by the striker engagement with the keeper when the drop tailgate is in an open position and the tubular frame member is positioned adjacent the tailgate when the tailgate is in its open position to maintain the spare tire carrier secured to the drop tailgate; and the pin of the lock device engaging the first hole when the spare tire carrier is attached by the striker to the keeper on the side of the drop tailgate.

15. The spare tire carrier as set forth in claim 14 wherein the keeper comprises a slot.

* * * * *